Oct. 21, 1969  J. H. SEXSTONE ET AL  3,473,539
BONDED FILTER ROD FOR SMOKING ARTICLES
Original Filed Feb. 3, 1965  2 Sheets-Sheet 1
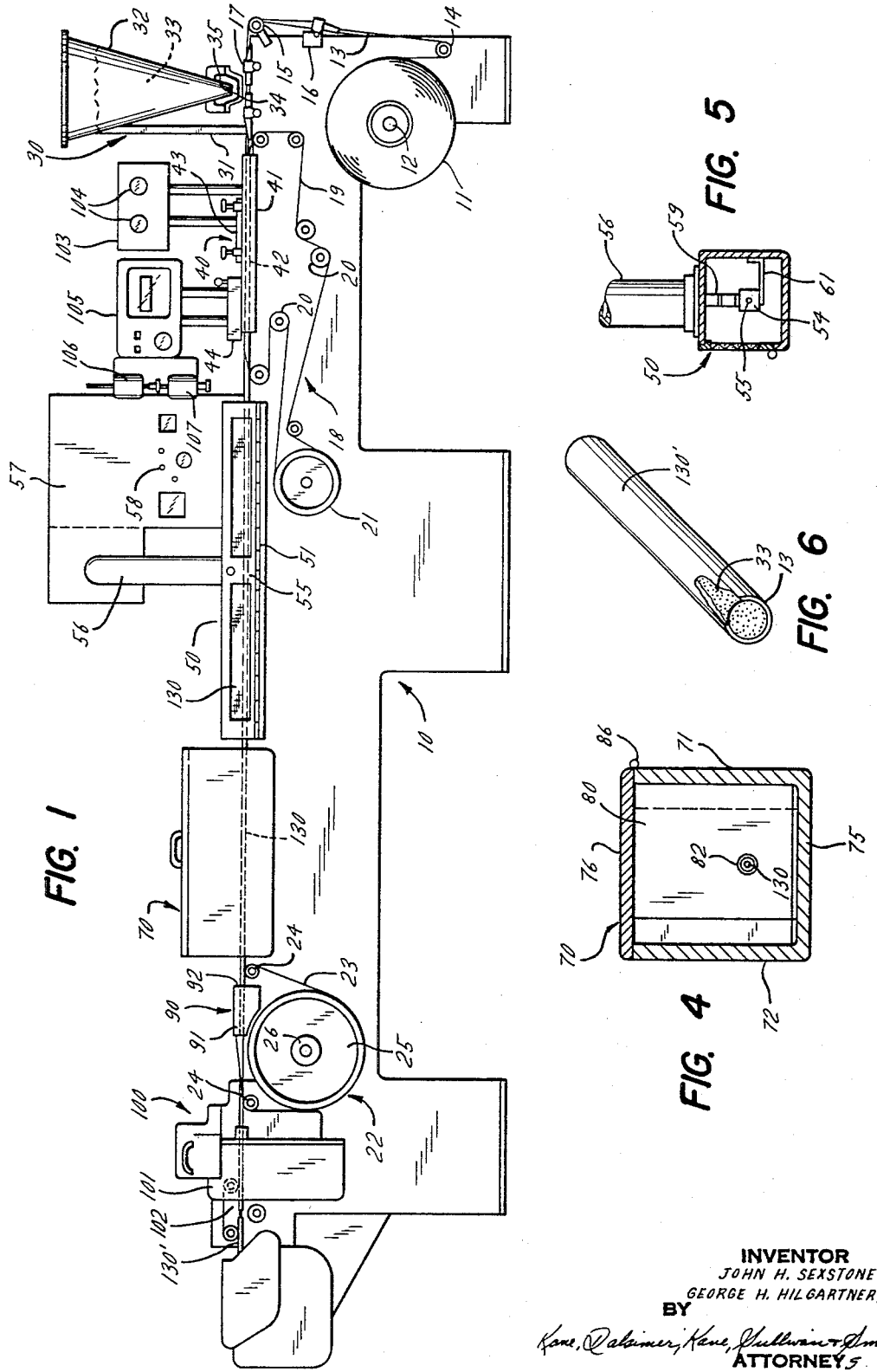
INVENTOR
JOHN H. SEXSTONE
GEORGE H. HILGARTNER, JR.
BY
ATTORNEYS

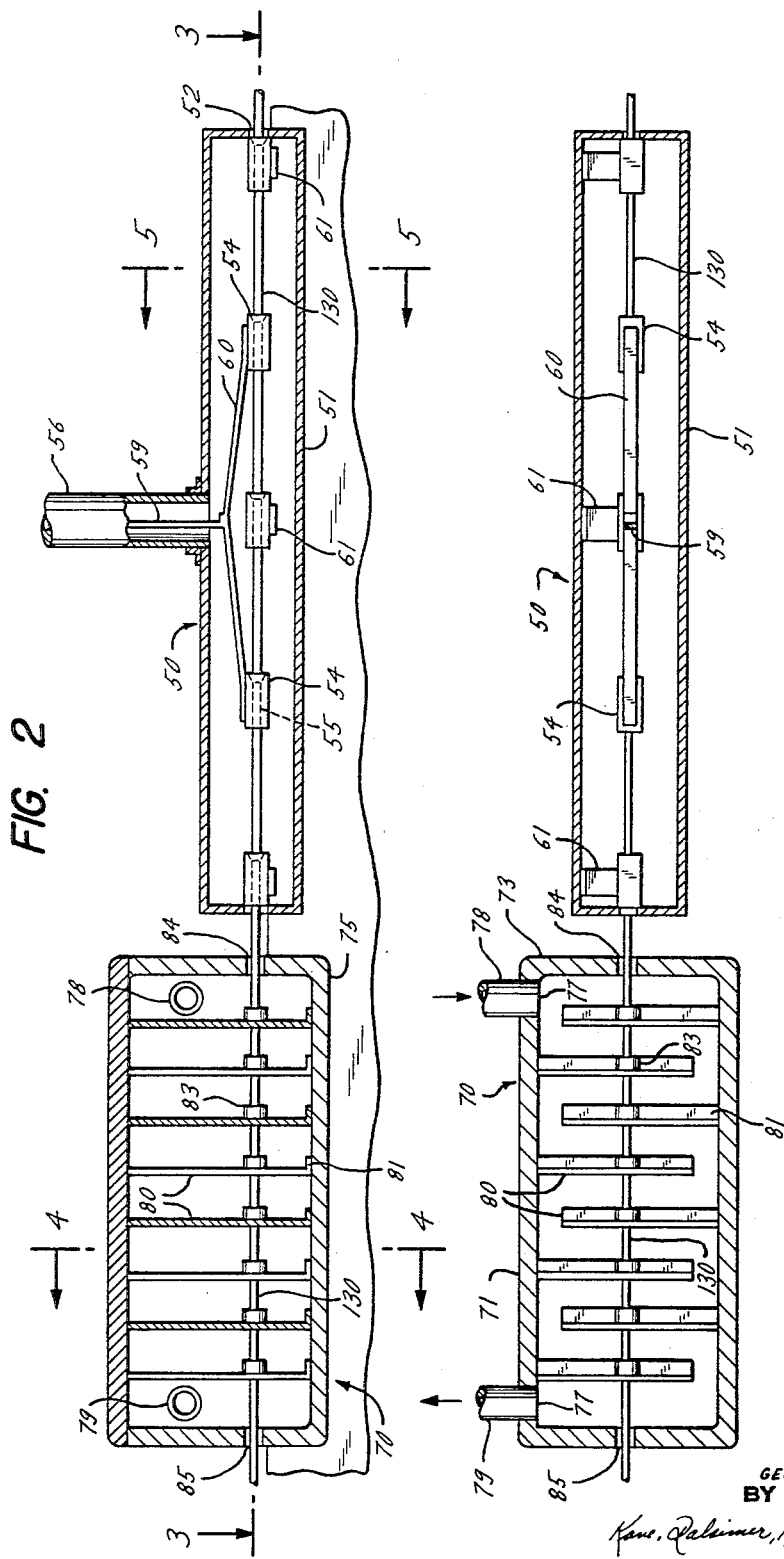

United States Patent Office 3,473,539
Patented Oct. 21, 1969

3,473,539
BONDED FILTER ROD FOR SMOKING ARTICLES
John H. Sexstone, Middletown, and George H. Hilgartner, Jr., Louisville, Ky., assignors to Brown & Williamson Tobacco Corporation, Louisville, Ky., a corporation of Delaware
Original application Feb. 3, 1965, Ser. No. 430,142, now Patent No. 3,400,032. Divided and this application Apr. 10, 1968, Ser. No. 740,006
Int. Cl. A24d 1/04
U.S. Cl. 131—267                    2 Claims

ABSTRACT OF THE DISCLOSURE

A filter rod unit for use with cigarettes and the like formed of charcoal particles bonded substantially uniformly throughout the rod by a polyethylene vinyl acetate copolymer and enclosed by a filter wrapping material.

---

This application is a division of our copending patent application Ser. No. 430,142, filed Feb. 3, 1965, and now Patent No. 3,400,032.

The present invention relates to filters for use with tobacco products but more specifically to an improved filter for use with cigarettes and the novel machine employed to produce the same.

The application of a filter unit for use with cigarettes and the like is well known in the art and filters of various type have now been in use for a considerable time.

The use of an adsorbent in filters for cigarettes is found to be desirable since these adsorbents efficiently function to remove certain constituents from the tobacco smoke. Further, to provide for optimum removal, it should be apparent that a maximum surface area of charcoal be exposed to the tobacco smoke as the latter travels through the filter. Therefore, to provide this maximum surface area and to provide for removal of these constituents in substantially greater quantities, it has been found that the implementation of granules of charcoal to form a filter body will achieve the desired result. But an absorbent filter in the form of loose granules of charcoal is not entirely satisfactory. This is due to the inability in obtaining a suitable compaction of the loose granules so that both a maximum surface area of charcoal is presented and the resistance to the flow of tobacco smoke is not substantially increased. Therefore, without being compacted, the loose granules will not maintain a stationary position and present a uniform cross-section within the filter paper enclosure, but rather, during handling, tend to mass together and create a void throughout the length of the filter. As should be apparent a substantial quantity of tobacco smoke will take the path of least resistance and travel through this void to thereby reduce the removal capability of the filter and substantially eliminate the function which the filter is to provide.

Therefore, it is an object of this invention to overcome the undesirable effect created by the use of a filter which contains an adsorbent in the form of loose granules of charcoal. To carry out this object, we provide a filter of a bonded charcoal medium which will remove certain constituents of tobacco smoke without a substantial loss in taste which the smoker finds pleasurable.

A further object is the provision of a novel filter rod forming means which produces this new improved filter element.

Other objects will readily come to mind during the course of the following description.

In carrying out this invention we provide a unit which comprises a feeding means that deposits a particulate mixture of filtering material on a traveling paper web, a forming means which functions to form the web and mixture into a continuous rod, a heating means wherein the filtering material is fused into a bonded rod by means of high frequency, resistance heating, and a cooling means wherein the rod is cooled. Thereafter, the continuous rod is cut to the desired length with the segments then being ready for subsequent use.

The segments can then be processed through the ordinary filter tip attachment machinery known to the industry. As is also well known, the charcoal sections may be combined with paper or cellulose acetate sections in producing a multiple filter for cigarettes in which the charcoal section is adjacent the tobacco or intermediate to other paper or fibrous sections as in the multiple filter type which is disclosed in a co-pending application Ser. No. 430,645, filed Feb. 5, 1965, and now Patent No. 3,357,320.

In the drawings, which both illustrate a preferred embodiment of our invention and form a part of this disclosure, and wherein like numerals are used to denote like parts throughout, FIGURE 1 is a side view of our filter rod making machine which shows the several component parts in operative relation to one another;

FIGURE 2 is an enlarged view of a portion of FIG. 1, specifically showing in cross-section, the heating and cooling units;

FIGURE 3 is a top view in cross-section showing that portion of the machine as in FIG. 2;

FIGURE 4 is a side view of the cooling unit and taken along the line 4—4 in FIG. 2;

FIGURE 5 is a side view of the heating unit and taken along the lines 5—5 in FIG. 2; and FIGURE 6 is a perspective view of a filter segment with a part broken away to show the filtering material enclosed by the paper web.

This filter segment is cut to the desired length and is denoted by the numeral 130. The segment, which is conveniently cut to a length of 100 mm., comprises an outer paper web 13 that envelopes an inner fused filtering material 33.

In FIG. 1 there is a showing of the filter rod making machine that includes a stationary frame structure generally indicated by the numeral 10. Suitably mounted on the frame in any convenient manner are the various operative parts which make up the total machine. Generally these operative parts, which define the working stations of the machine and carry out the filter rod making process, are a feeding mechanism 30, rod forming means 40, heating means 50, cooling means 70, reshaping means 90, and the various terminal parts 100 by which the rod is cut to the desired length and deposited in a storage bin for subsequent use. All of these parts will be discussed in detail hereinafter.

The frame structure 10 further carries various appointments, the operation of which will now be defined. A paper bobbin 11 carrying a continuous web of paper 13, upon which the filtering material is deposited, is rotationally supported on a shaft 12 that is journalled into the side wall of the frame. One side of the paper web 13, which is of a grade and quality customarily used to enclose a filtering material, may be coated with a heat sealable plastic substance, such as polyethylene. In the unheated condition, as when the paper is being unrolled from the bobbin, the plastic coating will not hamper the movement of the web, for in the unheated condition the coating is not tacky. The purpose for which this plastic coating is employed will be brought out later in the description. In the alternative, an uncoated paper may be suitably used and with such, a paste as is normally used in the sealing of the paper around the filter plug will be applied to the paper after the plug or rod is formed in the forming means 40. If an uncoated paper were to be used, the sealer heater 44, to be discussed below, would necessarily be either inoperative or replaced by a seam paster as is customary.

The continuous paper web from the bobbin is threaded around a pair of rollers 14 and 15 which are rotationally carried by the frame and then through a support member 16 that is also carried by the frame. The support 16 not only tends to keep the moving paper web from sliding off the pair of rollers but further acts to prevent the continuous paper web from vibrating in a direction transverse to the line of travel, which vibration tends to cause erratic rather than uniform motion of the web.

After passing the upper roller 15, the web will follow a path through a U-shaped support or trough 17 that is mounted on the frame 10 in a position directly beneath the feeding mechanism 30. The web, due to the action of the garniture belt 19, discussed below, will be formed to the arcuate configuration of the trough and as the web passes therethrough, a particulate mixture of filtering material 33 is continuously deposited upon its surface to be substantially confined by the web.

The filtering material 33 is conveniently a mixture of an adsorbent material and a binder. The adsorbent may be a suitable charcoal, for example, coconut or other charcoals, or other adsorbents such as alumina, silica gel, etc. The binder may be chosen from various types of materials such as polyethylene, polyethylene vinyl acetate and copolymers thereof, polyvinyl acetate, polystyrene, methyl cellulose, etc. The proportion of the particular adsorbent and binder which may be used is capable of varying over a wide range from between 5–35 parts binder to adsorbent with a particle size of adsorbent and binder being in the range of 12–200 mesh and 12–300 mesh, respectively. (U.S. Standard Sieve Series 1940.) In the preferred embodiment we use a particulate mixture composed of coconut charcoal and polyethylene vinyl acetate copolymer with good results.

Such mixture, after being acted upon in the heating unit and subsequently cooled, will define a filter rod which is a firm bonded mass rather than in the form of loose granules with this mass providing favorable gas phase removal. A favorable gas phase removal is achieved since the rod will be of a uniform cross-section throughout the filter length and consequently all of the tobacco smoke will be exposed to the adsorbent. Thus, it is desirable that after the mixture is heated, the area of exposed charcoal be a maximum. To provide this maximum surface area of charcoal, it is apparent that the binder be of such quality as not to minimize the area of exposed charcoal. We have found that optimum results have been achieved with a mixture of coconut charcoal and binder, as set forth above.

To both carry and support the travelling web of paper and the mixture thereon as it passes toward the rod forming means 40, we provide a conveyor that is generally indicated by the numeral 18. The conveyor comprises an endless garniture belt 19 and a plurality of pulley wheels 20, around which the belt rides. The shaft of each pulley may be journalled for rotation in the frame 10 with the individual pulleys keyed to the shaft or the individual pulleys may be mounted in any convenient manner as is well known in the art. The garniture belt carried by the pulleys is held taut in the customary fashion, as for example, by providing that at least one pulley 20 is manually adjustable. One pulley may alternatively be biased by means of a weight to an adjusted position and similarly provide the proper tension in the garniture belt 19 to prevent slippage and maintain a constant speed of travel. A drive wheel 21, for the conveyor, is also conventionally mounted on the frame and this wheel may be suitably geared to the output shaft of a drive motor (not shown). As would be apparent, the drive ratio between the motor and the drive wheel 21 is determined by the speed selected for the travelling web so that the required quantity of filtering mixture will be deposited thereon and that it will be properly acted upon during its movement through the various stations of the machine, as broadly defined above.

The rod which passes from the forming means 40 is continuously propelled through the heating and cooling stages by the conveyor 18 and together with the garniture belt is suitably supported within these stages during such movement.

The terminal end of the cooling station we provide a second conveyor generally indicated by the numeral 22. This conveyor is similar to conveyor 18 and also provided with a garniture belt 23, a pair of pulley wheels 24 and a main drive wheel 25. The drive wheel 25 is mounted on shaft 26 which is rotationally supported by the frame 10 and is also suitably geared to the output shaft of a motor. The pulley wheels 24 are mounted similarly to wheels 20 and further one of the pulley wheels 24 is capable of adjustment so as to maintain a proper tension in the belt 23.

Since both the conveyors 18 and 22 transport the filter rod to and through the various stages which make up our machine, it is apparent that the belts of both conveyors are to be moving at approximately the same speed. Therefore, the conveyor 22 will be geared to the output shaft of a drive motor in the same ratio as selected for conveyor 18.

The garniture belts 19 and 23 may be of any suitable material customarily used for such purpose. Obviously the width should be such that it will adequately support the paper web upon entering and leaving the forming stage and further to form the rod as will later be brought out.

Having specifically discussed the various appointments of the machine which supply the paper web, convey this web to the operative stages wherein the rod is formed and acted upon, we now refer more specifically to these operative stages of the machine which have been briefly mentioned above.

MIXTURE FEEDING UNIT

The feeding mechanism which we employ is a commercially available unit identified as a Syntron Vibra Flow Feeder and sold by the Syntron Company, Homer City, Pa. The feeder which is generally indicated in FIG. 1 by the numeral 30, is mounted on the frame structure 10 in any conventional manner so that the unit will undergo a vibratory movement during its operation. The particular mounting, for the sake of clarity, is indicated only by the brace 31 which at one end carries the funnel shaped hopper 32. The other end of the brace is connected to the frame 10 through a means (not shown) which produces such vibration.

During operation, a vibratory movement is imparted to the hopper 32 so that the particulate mixture 33 carried therein is deposited on a trough 34 which is located below the outlet opening 35 of the hopper. The trough is connected to the hopper and suitably inclined so that the deposited mixture will be metered from the trough, by the vibratory movement, onto the travelling web 13 during its passage through the support 17. Since the mixture deposited is to be constant and adequately dispersed on the web, the period of the vibration will be dependent upon the speed of the web as determined by the drive ratio of the conveyor.

ROD FORMING AND RESHAPING STATIONS

The web will generally maintain its arcuate configuration after leaving the feeding station 30 so as to partially enclose the particulate mixture thereon.

The web and mixture will then be "picked up" by the garniture belt 19 of conveyor 18, as previously discussed, with the belt thereafter carrying and supporting the continuous web and mixture to the rod forming means, which is indicated by the numeral 40 in FIG. 1 and mounted on the frame 10.

The rod forming means 40 is defined by an elongated enclosure 41 having a circular opening 42 throughout its entire length. As see in FIG. 1, the enclosure may be formed of separable halves and held together by means of a clamp 45.

As the garniture belt carrying the web and particulate mixture passes into the enclosure 41, the sides of the belt will tend to follow the general contour of the axial core in the enclosure with the result the web will follow the movement of the belt to completely encircle the mixture and in turn be completely encircled by the belt. Therefore, as the garniture belt traverses the length of the forming means, it will completely encircle the web and mixture, compressing the mixture slightly, forming a substantially compact filter rod 130.

The rod forming means, at its terminal end, further comprises a sealer heater 44 which is also conventionally mounted on the frame 10. The heater is mounted in a manner such that the heating element will be in intimate contact with the web's surface enveloping the partially formed rod as the rod exits from the enclosure 41. If the paper is coated with the sealable plastic material, as previously mentioned, the heat will cause the plastic to assume a tacky condition and thereby seal the web around the filter material.

As seen in FIG. 1, the reshaping means 90 is suitable mounted upon the frame structure 10 in such position that the rod, after being "picked up" by the garniture belt 23 of conveyor 22, will enter the reshaper. The reshaping means 90 is of a configuration similar to the forming means 40 such that the ends of belt 23, as the belt passes through the circular opening 91 within casing 92, will likewise follow the contour of the opening and again completely encircle the rod during its travel therethrough. By incorporating the reshaping means 90 in our rod making machine, the rod may if the situation arises be, again, suitably reshaped to the desired configuration if it has undergone any distortion. Although it is not contemplated that the rod will be distorted at this point it is advantageous to employ means 90 if reshaping is required. As will be brought out later, although the rod is substantially cooled upon leaving the cooler, it is not cooled to a point such that the filtering material will be solidified and prevent a reshaping if such is necessary. Therefore, if the rod undergoes no distortion, a reshaping means would not be essential.

HEATING MEANS

The heating unit which is used with the filter rod forming machine is, in FIG. 1, generally indicated by the numeral 50. We prefer to employ a high frequency electric heater. Such heaters operate in the radio frequency spectra. The unit is a commercially available device known in the trade as a Thermex Heater and manufactured by the Vetator Division of Chemetron Corporation, Louisville, Ky.

The heater 50 is suitably mounted upon the frame structure 10 and FIG. 1 clearly shows the operative relationship of the heater and the other stages which have been or are referred to below. From FIG. 1, only the general configuration of the unit may be seen but from the showing it is apparent that the heater has a pivotally operable front cover 53 which provides for easy access into the interior of the heater during periods when the unit is inoperative.

The interior of the unit and the elements therein is shown in detail in FIGS. 2, 3, and 5 and it is to these figures which we now refer.

The heating unit is defined by an outer enclosure 51 into which the filter rod 130 passes after being formed in the forming means 41. As previously discussed, the rod 130 is transported to the heater by means of the conveyor 18 and this rod enters the enclosure by means of an opening 52 in one end (right end to FIG. 3).

The enclosure is of any material which is suitable for such purpose and is properly insulated from the electrodes 54 that are supported within. As seen in both FIGS. 2 and 3, the enclosure surrounds a row of five electrodes which are provided with a hollow central portion 55 through which each increment of the rod will pass as it travels the length of the heater. By means of the hollowed electrodes the rod will be substantially supported within the confines of the enclosure to eliminate or at least reduce any distortion in a direction transverse to the line of travel. Such support is necessitated since in the heated condition the filter rod is extremely flexible and incapable of supporting itself. Further, by means of the hollowed electrodes heat is applied to the filtering material, as will be brought out below.

Connected by any suitable means at the top of the enclosure 51 is a conduit 56 which, at its other end is connected to the heater control box 57 which contains the electrical circuitry and a generator required to supply a proper voltage at a desired high frequency to alternate electrodes 54 and specifically, to the second and fourth electrode. The control box also carries on its face, various meters and dials to control the internal circuitry and these are generally indicated by the numeral 58.

Centrally mounted within and insulated from the conduit 58 is a bus bar 59 that is connected to a bus bar 60 which is connected in turn to the second and fourth electrodes so that a voltage potential is impressed thereon. It is to be pointed out that the voltage range of the heater and the potential of the electrodes will be dependent upon the type, size and density of the charcoal, the particular bonding agent used and the grade of the filter paper web which surrounds the filter mixture.

Each of the first, third, and fifth electrodes of one polarity are suitably grounded by means of a grounding bar 61 and therefore a voltage drop will exist between these electrodes and the second and fourth electrodes which are of opposite polarity.

The type of heating the rod undergoes has been found to be a high resistance heating which provides the optimum results, being that the material introduced reacts far better and the heating of the rod will be uniform throughout its cross-section. Other forms of heating commonly employed today for related purposes are either too slow for the rod volume contemplated or do not uniformly fuse the rod throughout because the heat applied thereto is not sufficient.

In practice, it is found that by passing the rod through the electrodes, the heating provided is a cross between capacitance and resistance heating. Of importance, however, is the fact that by such heating, the rod is uniformly heated from the inside out and a bonded rod is obtained which is substantially uniform in cross-section.

COOLING MEANS

The cooling unit which is employed with the filter rod forming machine is indicated by the numeral 70. FIG. 1 shows the cooling unit in a position suitably mounted on the base and frame structure 10 and its operative relationship with the other component parts which define the complete machine. FIGS. 2–4 show the cooling unit in greater detail and it is to these figures which we now refer.

The unit is of an elongated rectangular configuration having side walls 71, 72, end walls 73, 74, a base 75 and a pivotal top 76. The enclosure walls are formed of a suitable material and the unit may further be insulated by conventional means so as to provide for greater efficiency. Although not forming a part of this invention, the cooling unit may also be provided with a thermostat to maintain a constant temperature of the circulating fluid.

The side wall 71 is formed with openings 77 into which are received and fastened, as by welding, a pair of conduits 78, 79. Any suitable cooling fluid is circulated through the unit to cool the filter rod as it travels therethrough and by means of baffle plates 80, maximum circulation is achieved. The cooling fluid is introduced into the cooler by means of conduit 78 and exits at conduit 79 after travelling the length of the unit 70. As seen clearly in FIGS. 2 and 3 each adjacent baffle plate projects from opposite side walls to thereby cause the fluid to undergo a turbulent flow around the travelling filter rod.

As shown in FIG. 2, each baffle plate 80 is provided with a foot portion 81 which is suitably fastened to the base 75, as by welding. Each plate 80 further is provided with an opening 82 with a lip portion 83 in circumjacent relation to the opening. The lips 83 and openings 84, 85 in the end portions 73, 74, respectively, function to support the travelling rod as it traverses the length of the cooler.

As brought out above, the top 76 is pivotally openable by means of hinges 86, as seen in FIG. 4, to thereby provide easy access to the interior of the cooling unit 70.

By means of the baffle plates projecting from opposite sides of the enclosure, so as to lengthen the path of fluid flow and provide more efficient cooling, it is possible to provide for a drop of 100°–200° in the temperature of the filter rod. Due to the turbulent flow of the fluid around the travelling rod, this temperature drop will further be uniform throughout the rod.

After leaving the cooling unit, the rod is carried by a garniture belt 23 into a reshaping means 90 wherein any distortion in the rod is removed and the rod reshaped into the required circular configuration. As was brought out above, the rod will be substantially cooled in the cooling unit, yet not cooled to a point such that it becomes solidified. Therefore, if reshaping is required, such reshaping may be accomplished.

TERMINAL STATION

The structure at the terminal end of the machine is indicated by the numeral 100, as seen in FIG. 1, and generally comprises a cutter 101. The rod after leaving the cooler is carried to the cutter by the conveyor 22 and this rod is cut to the desired length, which is to be 100 mm. The individual cut segments 130' are subsequently carried by means of conveyor 102 to a collection point where the segments are stored and used as required.

The following is a specific example illustrating the use of our rod making machine. Mix 85 parts of coconut charcoal (hereinafter called "charcoal") which pass through a U.S. #30 screen (0.59 mm. sieve opening) and are retained by a U.S. #50 screen (0.297 sieve opening) with 15 parts of polyethylene vinyl acetate copolymer (hereinafter called "copolymer") binder having approximately the same particle size as the charcoal. After the charcoal and the copolymer have been blended so as to form a substantially homogeneous mix, the materials are deposited in the hopper of a feeding mechanism and are discharged by means of a vibratory movement onto a travelling continuous polyethylene coated web that has been formed into a U-shaped configuration to receive the materials. The web is travelling at a speed such that a sufficient amount of the mix will be deposited thereon and 75 feet of bonded rod per minute will be formed. The materials and web are formed into a rod of unbonded granules in a conventional manner. The unbonded granular rod is then passed into a heating unit to effect bonding of the materials. A 1000 volt high frequency potential is applied across adjacent electrodes so as to provide for rapid heating of the charcoal as the rod passes through the electrodes, thereby bonding the mixture throughout its cross-section. During the rod's travel through the heater, the rod attains a temperature of approximately 300° F. which is sufficient to cause the copolymer to assume a tacky condition to bond the charcoal, yet insufficient to cause a burning of the charcoal or a discoloration of the paper wrapper. Thereafter, the bonded rod is passed through a cooling zone to facilitate the cutting of the rod to the desired lengths with the cut portions thereafter being delivered to a storage bin for use in a filter plug assembly machine.

Further associated with the machine and clearly shown in FIG. 1 are various control units to which we now refer. Since these components are not of great importance herein, the reference is only brief. The control box for the Syntron Feeder is indicated by the numeral 103, and as would be obvious, carries within, the mechanism and circuitry that provides for the operation of the feeding unit. On the face of box 103 are a pair of dials 104 for controlling this circuitry and the vibratory period of the feeder.

Numeral 105 is the control box for the sealer heater 44 which regulates the temperature of the heater which is used to seam seal the web around the filter material.

Numerals 106 and 107 refer to the on-off switch for the Syntron Feeder and the rod maker starter switch, respectively.

In summary, it is seen that our filter rod making machine comprises a feeding mechanism which deposits a homogeneous particulate mixture of charcoal and binder on a travelling web of paper, a forming means wherein the rod is formed, a heater that fuses the mixture into a bonded charcoal rod and a cooling means wherein the rod is substantially cooled prior to being cut to the desired lengths for use in, for example, a multiple filter. It should be apparent that other adsorbents, such as alumina, could be formed into a bonded rod by following the example given above.

From the foregoing, it is apparent that we provide a filter making machine with its various operative parts and structure suitably oriented in relation to one another so that an unbonded filter rod may be formed, bonded by a heating unit, cooled and then cut into a desired length for later use in multiple filter.

We claim:

1. A filter for use with tobacco products which is capable of removing certain constituent parts from tobacco smoke and providing favorable gas phase removal, said filter comprising a wrapper, said wrapper defining a rod enclosing a firm bonded filtering mixture containing about 75–85 parts activated coconut charcoal and about 15–25 parts polyethylene vinyl acetate copolymer binder, said charcoal having a particle size of from approximately 12–200 mesh with a particle size of binder being substantially similar, and in the bonded state said mixture within said rod presents a uniform cross-section throughout the length of said filter and a maximum obtainable surface area of the bonded charcoal being exposed to the flow of tobacco smoke.

2. A filter as set forth in claim 1 wherein the preferred particle size of said activated coconut charcoal and said polyethylene vinyl acetate copolymer is of approximately 30–50 mesh.

References Cited

UNITED STATES PATENTS

| | | | |
|---|---|---|---|
| 2,703,794 | 3/1955 | Roedel | 260—86.7 |
| 3,217,715 | 11/1965 | Berger et al. | 131—267 X |
| 3,354,886 | 11/1967 | Berger et al. | 131—266 X |
| 3,236,244 | 2/1966 | Irby et al. | 131—265 X |
| 3,038,478 | 6/1962 | Tovey et al. | 131—269 |

MELVIN D. REIN, Primary Examiner

U.S. Cl. X.R.

93—1; 131—269